US 9,808,688 B2

(12) United States Patent
Piccolo

(10) Patent No.: US 9,808,688 B2
(45) Date of Patent: *Nov. 7, 2017

(54) SYSTEM AND METHOD FOR PLAYING A GAME

(71) Applicant: NEW SPORTS GROUP LLC, New York, NY (US)

(72) Inventor: Arthur Piccolo, New York, NY (US)

(73) Assignee: NEW SPORTS GROUP LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,489

(22) Filed: Dec. 16, 2015

(65) Prior Publication Data

US 2016/0107056 A1    Apr. 21, 2016

Related U.S. Application Data

(63) Continuation of application No. 14/067,141, filed on Oct. 30, 2013, now Pat. No. 9,242,157.
(Continued)

(51) Int. Cl.
*A63B 67/00* (2006.01)
*A63B 63/00* (2006.01)
(Continued)

(52) U.S. Cl.
CPC ............ *A63B 67/002* (2013.01); *A63B 63/00* (2013.01); *A63B 63/004* (2013.01); *A63B 71/02* (2013.01); *A63B 71/022* (2013.01); *A63B 71/04* (2013.01); *A63C 19/00* (2013.01); *A63F 13/00* (2013.01); *A63F 13/53* (2014.09);
(Continued)

(58) Field of Classification Search
CPC .................................................... A63B 63/007
See application file for complete search history.

(56) References Cited

U.S. PATENT DOCUMENTS 3,637,214 A * 1/1972 Glass ...................... A63F 7/305
273/126 R
4,284,277 A   8/1981 Leonard et al.
(Continued)

FOREIGN PATENT DOCUMENTS

GB        2387786      10/2003
WO        WO 94/07572   4/1994
WO        WO 95/24950   9/1995

OTHER PUBLICATIONS

"Another Way to Revolutionize Football," www.wordpress.com, https://gilkalai.wordpress.com/2011/06/09/another-way-to-revolutionize-football/ (Accessed Sep. 15, 2013).
(Continued)

*Primary Examiner* — Michael Dennis
(74) *Attorney, Agent, or Firm* — Andrews Kurth Kenyon LLP

(57) ABSTRACT

An arrangement, a computer system, and/or a method for playing a game include a playing area, a first set of scoring structures arranged at a perimeter of the playing area and that are active throughout the game, and a second set of scoring structures arranged at the perimeter of the playing area and that are active only during penalty periods of the game, where each pair of adjacent ones of structures of the first set is separated by one of the structures of the second set.

19 Claims, 4 Drawing Sheets

Related U.S. Application Data

(60) Provisional application No. 61/836,040, filed on Jun. 17, 2013.

(51) Int. Cl.

| | | |
|---|---|---|
| *A63B 71/02* | (2006.01) | |
| *A63B 71/04* | (2006.01) | |
| *A63F 13/00* | (2014.01) | |
| *A63F 13/53* | (2014.01) | |
| *A63C 19/00* | (2006.01) | |
| *A63B 24/00* | (2006.01) | |

(52) U.S. Cl.
CPC .......... *A63B 2024/0025* (2013.01); *A63B 2024/0037* (2013.01); *A63F 2300/8094* (2013.01)

(56) References Cited

U.S. PATENT DOCUMENTS

| 4,453,720 | A | 6/1984 | King |
|---|---|---|---|
| 4,911,443 | A | 3/1990 | Foster |
| 5,826,876 | A | 10/1998 | Wagner |
| 7,766,771 | B2 | 8/2010 | Vysosias |
| 8,109,835 | B2 | 2/2012 | Norris |
| 8,435,142 | B2 | 5/2013 | Gibson |
| 8,506,370 | B2 | 8/2013 | Homsi |
| 2003/0032467 | A1 | 2/2003 | Mayer et al. |
| 2003/0087711 | A1 | 5/2003 | Morrison |
| 2008/0252015 | A1* | 10/2008 | Eskildsen ............ A63B 63/004 273/371 |
| 2009/0227398 | A1* | 9/2009 | Gibson ............... A63B 41/02 473/416 |
| 2010/0009768 | A1 | 1/2010 | Munson, Jr. |
| 2011/0028249 | A1 | 2/2011 | Ofori-Ansah |
| 2011/0275457 | A1* | 11/2011 | Roedel ............... A63C 19/00 473/415 |

OTHER PUBLICATIONS

"Kronum: The Unholy Basketball/Quidditch/Soccer Mashup," www.wired.com, http://www.wired.com/playbook/2011/06/09/kronum-unholy-sports-mashup/ (Accessed Sep. 15, 2013).

"Latin Course for the Virtual School of Languages," www.learnlangs.com, http://www.learnlangs.com/latin/lessons/1htm (Accessed Sep. 16, 2013).

International Search Report and Written Opinion in PCT/US2014/042492, dated Nov. 4, 2014.

European Search Report dated Mar. 14, 2017, in corresponding European Application EP 14 81 4247.

* cited by examiner

SYSTEM AND METHOD FOR PLAYING A GAME

FIELD OF THE INVENTION

The present application relates to arrangements, a computer system, and methods for playing a game. In particular, the present application relates to a game played with a ball and having two sets of scoring structures, each set having distinguishable characteristics, where structures of each set are arranged intermittently between structures of the other set.

BACKGROUND

Ball games have been around for thousands of years. Cuju, the predecessor to modern association football, was played in China over two thousand years ago. Shrovetide Football and Caid (similar to Gaelic football) were played in Europe over five hundred years ago. Over the past few centuries, new games have been developed which model after those earlier games as well as their modern counterparts, often in an attempt to provide games that are more enjoyable and rewarding to both players and spectators alike.

Some of the newer games have been developed to provide simplified rules so that even non-professional players/recreational players can understand and participate in the game. Others have been developed to provide more tactical depth and to require more sophistication so that they are most suited for participation by professional players. Some of these games provide a refined and/or redesigned pitch in order to enhance the unpredictability and excitement of the game, in contrast to the often codified dimensions and shapes of previously used playing fields (See U.S. Pat. Nos. 4,482,157, 5,207,433, and 8,435,142; and U.S. Patent Application Publication Nos. 2006/0189416 and 2007/0072702). However, each of these newer games lacks certain structural and functional features which may explain why none of these newer games have thus far captured the attention and admiration of large masses of people.

SUMMARY

Accordingly, there is a need for a new sport/game that provides more exciting features. Accordingly, an example embodiment of the present invention provides a game played on a playing area having a circular configuration in which there are four structures of a first set of structures equidistantly disposed about the circumference of the playing area and four structures of a second set of structures equidistantly disposed about the circumference of the playing area and alternately arranged about the circumference with the four structures of the first set of structures, where the structures of the first set of structures include three distinct scoring zones, a penalty zone is provided adjacent to each of the four structures of the second set of structures in which penalized players are confined until expiration of a penalty period, and respective structures of the second set of structures are available for scoring by a team when the respective adjacent penalty zone is occupied by a penalized player of the opposing team.

It will be appreciated that, while the described arrangements of example embodiments of the present invention are contemplated as being used primarily for playing a ball game, they do not require playing a ball game (i.e., they can be used for other activities or events). Furthermore, according to example embodiments, the game is played as a physical game, and according to alternative example embodiments, the game is played as a computer game, video game, electronic game, and/or via other platforms that facilitate play.

In a non-limiting embodiment of the present invention, an arrangement for playing a game is provided, including: a playing area; a first set of scoring structures arranged at a perimeter of the playing area and that are active throughout the game; and a second set of scoring structures arranged at the perimeter of the playing area and that are active only during penalty periods of the game; where each pair of adjacent ones of structures of the first set is separated by one of the structures of the second set.

In an example embodiment of the invention, the arrangement further includes a barrier surrounding, and defining an outer boundary of, the playing area, and the structures (i) are disposed in the barrier and/or (ii) define openings in the barrier.

In an example embodiment of the invention, all of the structures of the first set are structurally the same as each other and are structurally different than the structures of the second set.

In an example embodiment of the invention, all of the structures of the second set are structurally the same as each other.

In an example embodiment of the invention, the structures of the first set are configured so that access for entry therein of a ball is never restricted, and the structures of the second set are configured to selectively provide access for entry therein of the ball only during penalty periods of the game.

In an example embodiment of the invention, the playing area is circular with the structures of the first and second sets being positioned at respective positions along the circumference of the circular playing area.

In an example embodiment of the invention, a diameter of the circular playing area is approximately 80-100 yards.

In an example embodiment of the invention, the plurality of structures are equally spaced about the perimeter of the playing area.

In an example embodiment of the invention, each structure of the second set is centered on a center point between two adjacent structures of the first set.

In an example embodiment of the invention, for each pair of adjacent ones of structures of the first set, a distance between the pair of structures is the same as a distance between the structures of each other pair of adjacent ones of the structures of the first set.

In an example embodiment of the invention, for each pair of adjacent ones of structures of the second set, a distance between the pair of structures is the same as a distance between the structures of each other pair of adjacent ones of the structures of the second set.

In an example embodiment of the invention, the playing area is a field, court, ice rink, or swimming pool.

In an example embodiment of the invention, the playing area includes a first set of demarcated zones and a second set of demarcated zones; each zone of the first set of zones is proximate a respective one of the structures of the first set of structures; each zone of the second set of zones is proximate a respective one of the structures of the second set of structures; the zones of the first set of zones are different than the zones of the second set of zones; and penalized players are confined to at least one of the second set of zones during a penalty period of the penalty periods.

In an example embodiment of the invention, each of the zones is triangular with one side of the triangle extending between exterior edges of a respective one of the structures. In an example embodiment of the invention, the one side is curved such that, with respect to the one side, the triangle is a Reuleaux type triangle.

In an example embodiment of the invention, each structure of the second set includes a gate which is configured to open and close to thereby selectively control entry of a ball therethrough.

In an example embodiment of the invention, the arrangement is configured to determine whether the zone proximate an individual structure is occupied by one of the penalized players, and the gate of the individual structure of the second set opens when the zone proximate the individual structure is occupied by the penalized player.

In an example embodiment of the invention, a sensor determines whether the zone proximate the individual structure is occupied by the penalized player, and the gate of the individual structure of the second set is opened by a computer processor in response to data from the sensor. In an alternative example embodiment, a referee determines whether the zone proximate the individual structure is occupied by the penalized player, and the gate of the individual structure of the second set is opened by the computer processor in response to user-input from the referee concerning occupation of the zone.

In an example embodiment of the invention, the arrangement further includes a sensing system, including a plurality of sensors, the plurality of sensors including, for each of at least one of the second set of zones, a respectively associated sensor; and a processor coupled to the plurality of sensors, the processor configured to, for the each of the at least one of the second set of zones: receive data from the respective sensor associated with the respective zone; in a first determining step and based on the received data, determine whether a penalized player is occupying the respective zone; based on the determination, determine, in a second determining step, whether the gate is to be open or closed; and control the gate in accordance with the determination of the second determining step In an example embodiment of the invention, the arrangement further includes at least one sensing system including at least one respective sensor associated with each of the structures of the first and second set; and a processor coupled to the plurality of sensors, and configured to determine, based on data from the at least one sensing system, whether a ball has entered any of the structures.

In another example embodiment of the present invention, a computer system includes at least one processor configured to: display a graphical user interface (GUI) that includes a graphical representation of a playing area, a first set of graphical structures arranged at a perimeter of the graphical representation of the playing area, and a second set of graphical structures arranged at the perimeter of the graphical representation of the playing area, where each pair of adjacent ones of structures of the first set is separated by one of the structures of the second set; in response to satisfaction of a predetermined penalty condition, the processor is configured to change a state of each of at least one of the graphical structures of the second set to a ball entry state in which a ball representation can satisfy an entry condition in which the ball is considered to enter the respective structure responsive to user input for play of a game; and all of the graphical structures of the first set are set to the ball entry state for an entire duration of the game.

In another example embodiment of the present invention, a method of playing a game includes the steps of providing a playing area, a first set of structures at a perimeter of the playing area that are active throughout the game, and a second set of structures at the perimeter of the playing area that are active only during penalty periods of the game; assigning at least one structure of the first set and at least one structure of the second set to a first team; and assigning at least one structure of the first set and at least one structure of the second set to a second team; starting the game by placing a ball in the playing area; and scoring points by propelling the ball into (i) at least one structure of the first set and/or (ii) at least one structure of the second set of the opposing team; where a team whose point tally is the highest at an end of the game is the winner of the game.

In an example embodiment of the method, a player is penalized if the player violates a rule of the game; and, in response to such violation, the player is confined to a demarcated zone proximate a respective one of the structures of the second set of structures for a duration of a penalty period of the penalty periods.

In an example embodiment of the method, a point can be scored by entry of the ball into the respective one of the structures of the second set of structures only during penalty periods in which the player is confined to the demarcated zone.

Other features and aspects of the present invention will become more fully apparent from the following brief description of the drawings, the detailed description of the non-limiting embodiments, the appended claims, and the accompanying drawings.

DETAILED DESCRIPTION OF THE EMBODIMENTS

Figure 1:
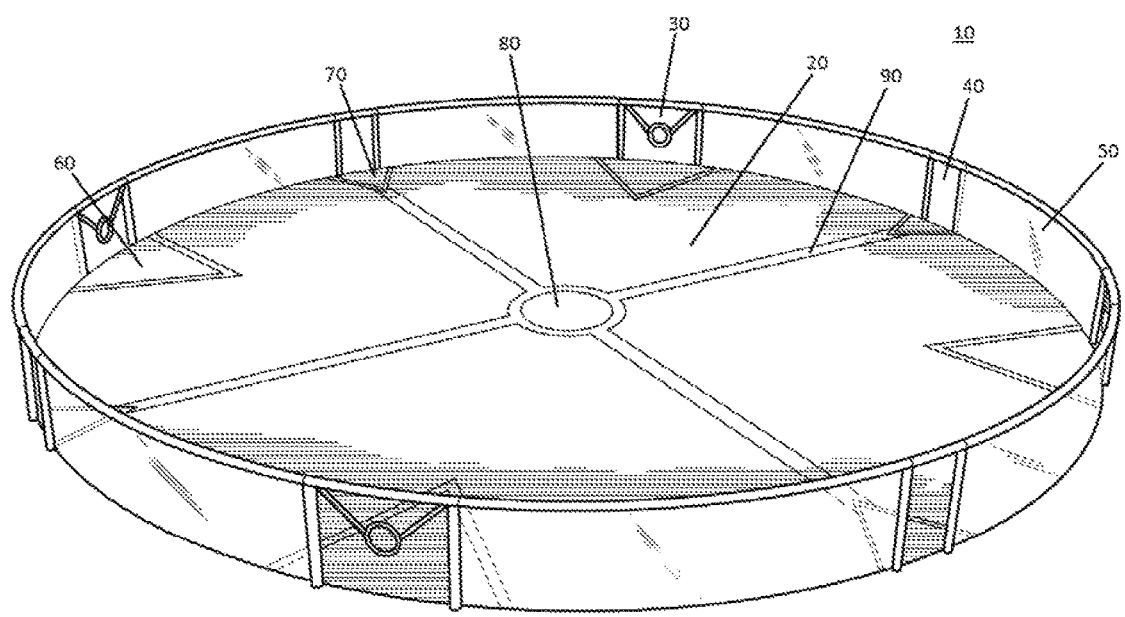
FIG. 1 illustrates a perspective view of an arrangement for playing a game, according to an example embodiment of the present invention.

An example embodiment of the invention is illustrated in FIG. 1, which shows an arrangement 10 for playing a game. The arrangement 10 includes a circular playing area 20, a first set of four scoring structures 30 arranged at a perimeter of the circular playing area 20, and a second set of four scoring structures 40 that are different than the first set of scoring structures 30 and are arranged at the perimeter of the circular playing area 20. The first set of scoring structures 30 and the second set of scoring structures 40 are arranged alternately around the perimeter of the circular playing area 20, so that each pair of adjacent ones of individual structures of the first set of structures 30 are separated by one of the individual structures of the second set of structures 40.

While FIG. 1 shows the first and second sets of structures 30, 40 to be physically/structurally different from each other, it is also within the scope of the present invention for the first and second sets of structures 30, 40 to be physically identical. In such an embodiment, the first and second sets of structures 30, 40 can still be differentiated from each other by their modes of operation. For example, according to an example embodiment, the first set of structures are active, e.g., available for scoring, throughout the duration of the game, while the second set of structures 40 are active, e.g., available for scoring, only during penalty periods of the game.

Figure 3:
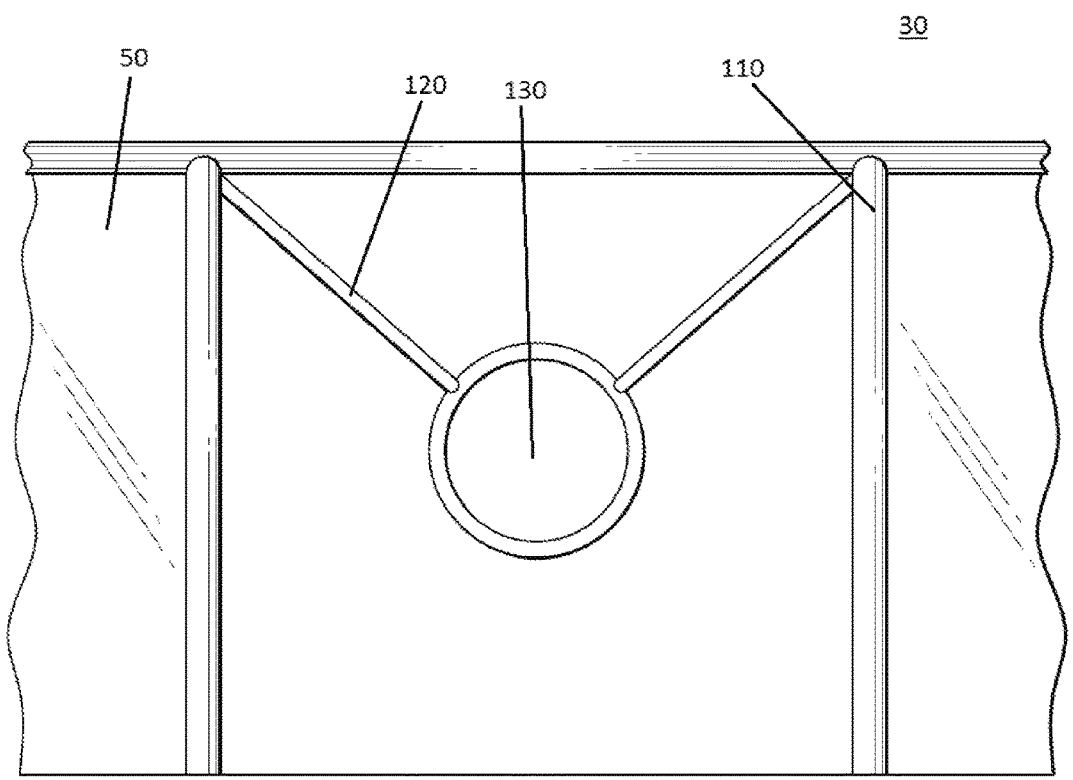
FIG. 3 illustrates a frontal view of a structure of first set of structures, according to an example embodiment of the present invention.
Figure 4:
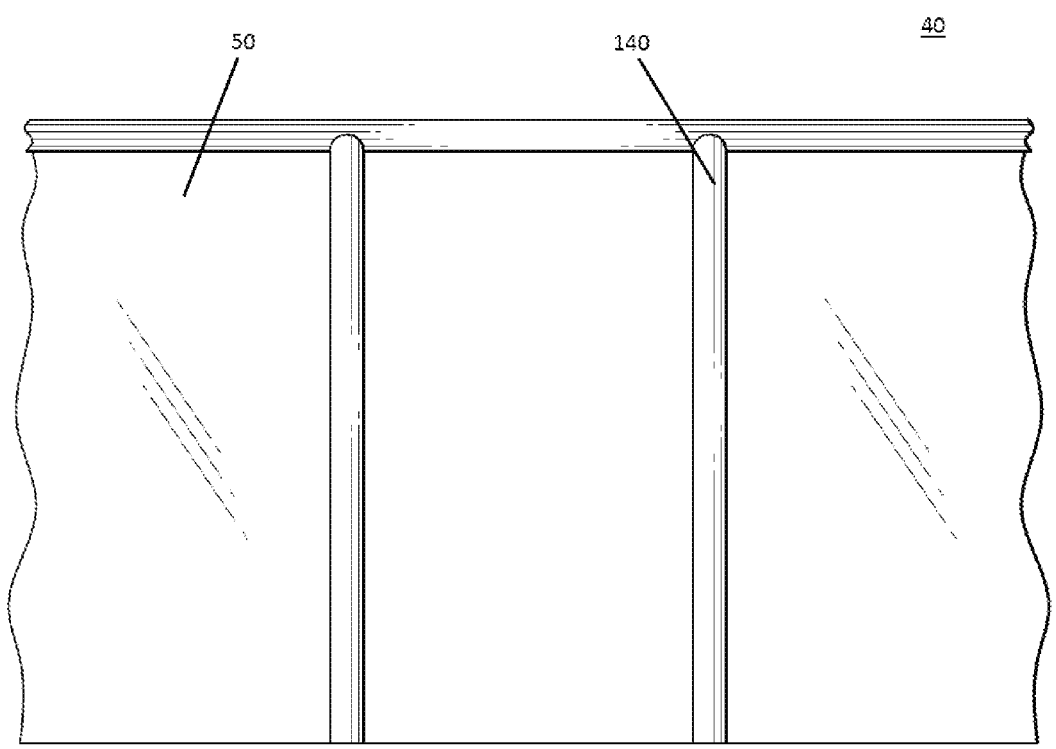
FIG. 4 illustrates a frontal view of a structure of a second set of structures, according to an example embodiment of the present invention.

According to example embodiments in which the two sets of structures 30, 40 are physically different from one another, in an example embodiment a difference is that they have different types of openings, e.g., different sized-openings and/or different shaped-openings. For example, the first set of scoring structures 30 can have larger openings than the second set of scoring structures 40, and/or the first set of scoring structures 30 can have several scoring zones (as shown in FIG. 3) while the second set of scoring structures 40 can have only one scoring zone (as shown in FIG. 4).

In an alternative example embodiment of the present invention, the arrangement 10 includes a set of structures arranged around the perimeter of the playing area, where at least one structure of the set of structures is differentiated from at least one other structure of the set of structures by its mode of operation. For example, at least one structure is active, e.g., available for scoring, throughout the duration of the game, while at least one other structure is active, e.g., available for scoring, only during penalty periods of the game.

The circular playing area 20 of the present invention can have a predetermined diameter of, e.g., approximately 80-100 yards. However, any diameter suitable for playing a game is within the scope of the present invention. It will also be appreciated that other geometrical configurations are possible for the playing area according to alternative example embodiments, e.g., square, semicircular, rectangular, triangular, elliptical, pentagonal, hexagonal, or any other suitably appropriate geometric shape. Indeed, according to an example embodiment of the present invention, the playing area 20 can have a square configuration with a predetermined side length. When playing on such a playing area, the rules of the game can be identical to the rules used described herein with respect to play on a circular playing area, or the rules can be adjusted to correspond with the specific type of arrangement used while playing the game.

The goals of the first set of structures 30 can be intermittently arranged between pairs of goals/structures of the second set of structures 40, as shown in FIG. 1. Alternatively, other arrangements of the goals with respect to each other, and/or with respect to the playing area, are possible. For example, instead of each goal of the first set of structures 30 being arranged between a respective pair of goals of the second set of structures 40, two goals of the first set of structures can be arranged between a pair of adjacent goals of the second set of structures 40.

As shown in FIG. 1, each goal/structure 30, 40 can be arranged at least substantially equidistant from an adjacent goal. That is, the plurality of structures 30, 40 can be equally spaced about the perimeter of the playing area 20, such that, for example, each structure of the second set 40 is centered on a center point between two adjacent structures of the first set 30. Alternatively, all or some of the goals can be closer to, or farther away from, adjacent goals along the circumference of the playing area.

According to an example embodiment, the first set of scoring structures includes four individual structures 30. All four of the structures 30 of the first set can be structurally the same as each other and can be structurally different than the structures 40 of the second set (discussed below). However, it will be appreciated that other numbers of scoring structures are possible, e.g., two or six. According to an example embodiment, half of the first set of scoring structures 30 are assigned to one of the teams, while the other half of the first set of scoring structures 30 are assigned to the opposing team.

The playing area can be a field of grass which has a flat profile. However, other suitable spatial playing areas can be used, e.g., an ice rink, basketball court, football field, baseball diamond, or swimming pool. The game can be played indoors or outdoors. In addition, other suitable surface profiles are possible such as curved, inclined, hilly, and/or stepped. The game can also be played on turf, dirt, mat, pavement, wood, ice, snow and/or any other suitable surface for playing a game.

A barrier 50 of a predetermined height can surround the playing area 20 along its perimeter. The surrounding barrier 50 can define an outer boundary of the playing area 20. In such a case, the structures 30, 40 can be disposed in the barrier 50 and/or define openings in the barrier 50. As shown in FIG. 1, the barrier 50 encloses the playing area 20 except for where the structures 30, 40 of the first and second set of structures are located. The barrier 50 can serve to demarcate the playing area 20, separate the playing area 20 from a surrounding area, and/or keep spectators off the playing area 20.

In a preferred example embodiment, the predetermined height of the barrier 50 is approximately 12 feet. However, other barrier heights are within the scope of the present invention. Indeed, according to an example embodiment of the present invention, the barrier is defined by a chalk line or by placed objects surrounding the playing area 20.

The barrier 50 can be made of fiberglass. However, any suitable material, or combination of suitable materials, is possible, such as wood, metal, and/or canvas. In addition, the barrier 50 can be in the form of a wall, fence, gate, boards, windows, and/or netting, or any other suitable barrier.

According to example rules of the game (discussed in further detail below), the barrier 50 is considered in play during the game so that if the ball hits the barrier 50, play continues without interruption. In an alternative example embodiment, the game stops when the ball hits the barrier 50.

As shown in FIG. 1, the playing area 20 can be divided into four quadrants with a center region 80. The quadrants can be visibly identified by two perpendicularly extending lines 90 that each extends between opposite regions of the barrier 50 and through the center region 80 of the playing area 20. Alternatively, four lines can each extend between opposite regions of the barrier 50 and through the center region 80 of the playing area 20. The lines can be continuous, broken, or any other visual marker that can be easily recognized. The lines can be illuminated throughout the game or at only certain times such as, for example, during a penalty period. The lines can also be used to identify and differentiate between the two sets of structures 30, 40.

The center region 80 can be identified by a visual marker. One purpose of the center portion is to indicate where the ball is to be placed, e.g., by a referee, at the start of the game and at the start of each play or certain plays during the game. The visual marker can be in the form of a point, line, circle, concentric circles, or any other geometric shape that can be easily identified.

Figure 2:
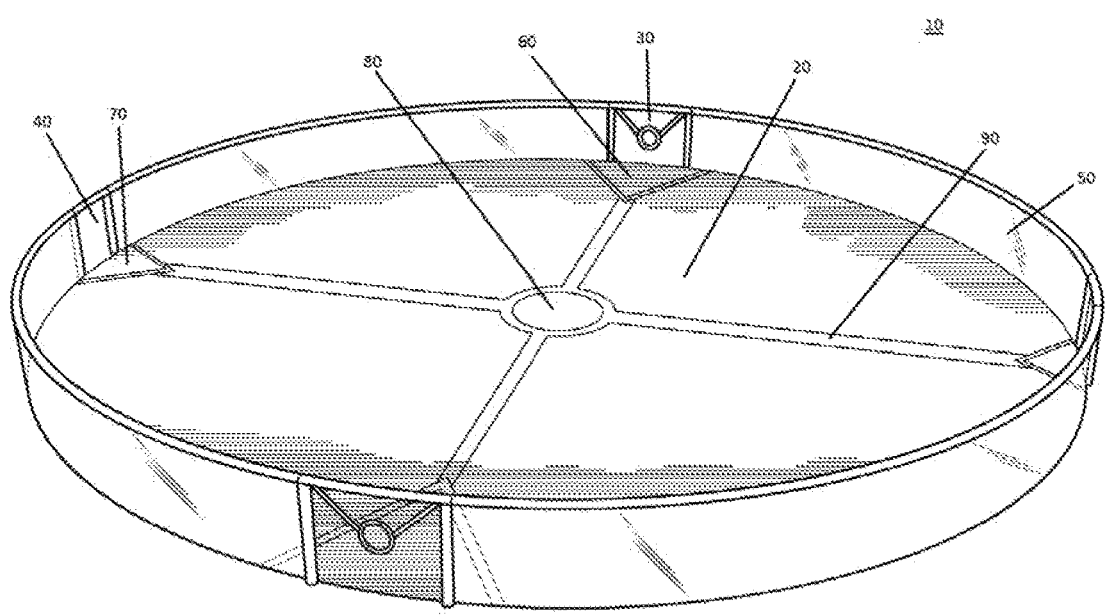
FIG. 2 illustrates a perspective view of an arrangement for playing a game, according to an example embodiment of the present invention.

FIG. 2 shows an alternative arrangement for playing a game. In contrast to FIG. 1 which shows a first and second set of scoring structures 30, 40 including four structures each, the arrangement illustrated in FIG. 2 shows a circular playing area 20 including first and second sets of scoring structures 30, 40 including two structures each.

FIG. 3 shows an example embodiment of a structure 30 of the first set of scoring structures. As shown in FIG. 3, the structure is made up of two vertical posts 110 and two partial diagonal posts 120 extending diagonally from a respective upper portion of the vertical posts 110. The diagonal posts 120 connect to a center portion 130 between the two vertical posts 110. The center portion 130 has a circular shape. In alternative example embodiments, instead of a circular shape, the center portion 130 can have any other shape suitable for allowing a ball, or any other object used while playing the game, to pass therethrough.

In an alternative embodiment of the structure 30 of the first set of scoring structures, the structure 30 can additionally include a horizontal crossbar extending between the two vertical posts 110. The horizontal crossbar can form a part of the barrier 50 surrounding the playing area 20, or can be a separate crossbar attached to the barrier 50. However, other structures or openings with or without posts, crossbar, goal line, and/or net suitable for receiving a ball, or for allowing a ball to pass therethrough can be used as the structure 30 according to alternative example embodiments of the present invention.

A goal line (not shown in the Figures) can be marked on the playing area 20 between the two vertical posts 110. A net (not shown in the Figures) for catching the ball/object used as a playing piece in the game can be attached to the back of the vertical posts 110 and/or to the horizontal crossbar and/or diagonal posts 120 and/or center portion 130.

Each structure 30 of the first set of scoring structures is preferably 24 ft. wide and 12 ft. high. However, structures of different dimensions suitable for receiving a ball during a game are also within the scope of the present invention.

Each structure 30 of the first set of scoring structures can have distinct scoring zones. That is, each structure 30 of the first set can be divided into a respective plurality of scoring zones, e.g., three distinct scoring zones, which can be defined and differentiated by their spatial arrangement within, and with respect to, the overall structure 30. However, other numbers of scoring zones are also within the scope of the present invention.

The scoring zones can be formed by the arrangement of the center portion 130, vertical posts 110, and diagonal posts 120. A first zone can be defined being within the center portion 130, a second zone can be defined by the area above the center portion 130 and between the diagonal posts 120, and a third zone can be defined by the area beneath the diagonal posts 120 and between the vertical posts 110, excluding the center portion 130. Alternatively, rings, or any other arrangement forming a plurality of scoring zones of different scoring difficulty can be attached to, or be a part of, the structures 30 of the first set.

The scoring zones can be assigned varying point values (e.g., 1, 2 or 3 points) with the more difficult scoring zones assigned more points, where points are awarded to a team when a player of the team propels the ball through one of the scoring zones. In an example embodiment, a point(s) is scored when a player of a team propels the ball over the crossbar and between vertical posts, into a hoop, or into or through one or more other predefined structures.

As shown in FIG. 1, the first set of scoring structures 30 can be disposed at a center point within a respective quadrant. The first set of scoring structure 30 can be provided entirely off the playing area 20 but between segments of the barrier 50, or portions of the first set of scoring structures 30 can extend over portions of the playing area 20.

The structures 40 of the second set of structures can be equidistantly disposed about the circumference of the playing area 20 and arranged about the circumference alternately with the structures 30 of the first set, as shown in FIG. 1. Alternatively, all or some of the structures 40 of the second set can be closer to, or farther away from, adjacent structures along the circumference of the playing area.

The structures of the second set 40 can be disposed along the circumference of the playing area 20 and aligned with the quadrant lines 90 that extend from the center region 80 of the playing area 20 toward the perimeter of the playing area 20.

All of the structures of the second set 40 can be structurally the same as each other. The second set of structures 40 can include four individual structures. However, it will be appreciated that other numbers of structures 40 are possible, e.g., two or six, preferably the same as the numbers of structures of the first set of structures 30. Half of the structures of the second set 40 can be assigned to one of the teams, and the other half can be assigned to the opposing team.

During a game played according to, or using, example embodiments of the present invention, structures of the second set 40 are available for scoring by one team only when an adjacent second zone 70 (discussed below) is occupied by a penalized player of the opposing team. Thus, when this occurs, an additional scoring structure is available for scoring by that one team, giving that team an advantage during the game. However, when the adjacent second zone 70 is not occupied by a penalized player, the adjacent second zone 70 is not available for scoring.

FIG. 4 shows the structures 40 of the second set as including two vertical posts 140. As with the structures of the first set of structures 30, the structures 40 of the second set can additionally include a horizontal crossbar extending between the two vertical posts 140. The horizontal crossbar can form a part of the barrier 50 surrounding the playing area 20, or can be a separate crossbar attached to the barrier 50. However, use of other structures or openings with or without posts as the structures 40, a crossbar, a goal line, and/or a net suitable for receiving a ball, or for allowing a ball to pass therethrough, is within the scope of the present invention. The structures 40 of the second set can be provided entirely off the playing area 20 between segments of the barrier 50, or portions of the structures 40 of the second set can extend over portions of the playing area 20.

A goal line (not shown in the Figures) can be marked on the playing area 20 between the two vertical posts 140. A net (not shown in the Figures) for catching the ball/object used in the game can be attached to the back of the vertical posts 140 and/or to the horizontal crossbar.

A door assembly/gate (not shown in the Figures) capable of preventing entry into the second set of scoring structures 40 can form part of the structure 40. That is, each structure 40 of the second set can include a gate which is configured to open and close to thereby selectively control entry of a ball therethrough.

According to an example embodiment, the arrangement 10 includes a component configured to determine whether the zone 70 proximate an individual structure 40 is occupied by one of the penalized players, such that the gate of the individual structure 40 of the second set opens when the zone 70 proximate the individual structure 40 is occupied by the penalized player. For example, according to an example embodiment, a sensor is configured to determine whether the zone 70 proximate the individual structure 40 is occupied by the penalized player, and the gate of the individual structure of the second set 40 is opened by a computer processor in response to data from the sensor.

Alternatively, or additionally, a referee can determine whether the zone 70 proximate the individual structure is occupied by the penalized player, and the gate of the individual structure of the second set 40 can be opened by the computer processor in response to user-input from the referee concerning occupation of the zone 70.

Alternatively, or additionally, the door can be manually opened, e.g., by the referee.

Furthermore, each structure 40 of the second set can have a sensing system, including a plurality of sensors, the plurality of sensors including for each of at least one of the second set of zones 70 a respectively associated sensor. A processor can be coupled to the plurality of sensors and the processor can be configured to, for the each of the at least one of the second set of zones 70, receive data from the respective sensor associated with the respective zone 70, and, in a first determining step and based on the received data, determine whether a penalized player is occupying the respective zone 70. Based on the determination, in a second determining step, the processor can determine whether the gate is to be open or closed, and control the gate in accordance with the determination of the second determining step.

The arrangement 10 can also include at least one sensing system including at least one respective sensor associated with each of the structures 30, 40 of the first and second sets. The arrangement 10 can also include a processor coupled to the plurality of sensors, and configured to determine, based on data from the at least one sensing system, whether a ball has entered any of the structures 30, 40.

The sensing system and processor can be additionally configured to ignore entry into the second set of scoring structures 40 if the entry is not made by the ball or other predetermined playing piece, or if entry is made not during a penalty period. The sensors can be turned on and off throughout the game depending on whether an adjacent second zone 70 is occupied.

In an alternative example, the second set of scoring structures 40 forms a defined open area on the perimeter without including any defined structure. When not occupied by a penalized player, the second set of scoring structures 40 can be open areas where players can enter and exit the field. If, for example, a ball, passes through the defined open area during play when the zone 70 proximate the individual structure 40 is not occupied by a penalized player, it is declared "out of bounds" and the opposing team takes possession of the ball when it is returned to the playing area.

According to example embodiments, a player is penalized during the game if the player violates a rule of the game. For example, a player can be penalized for committing a foul by kicking, tripping, striking, tackling, pushing, holding, and/or spitting at an opposing player. A player can also be penalized for entering with any part of his/her body into an opposing team's first set of zones 60 (discussed below) where a team's goalie is stationed. Penalties can be issued for any rule infraction as determined by the rules of the game. In an example embodiment of the present invention, a user interface can be provided and configured to receive user input indicating whether a penalty has occurred and whether a penalty period is underway. Indeed, according to an example embodiment, opening of a door of a penalty zone of a structure 40 can be performed by a processor in response to such input.

In an example embodiment, in response to such violation, the player is confined to the demarcated zone 70 proximate a respective one of the structures 40 of the second set for a duration of a penalty period of the penalty periods, and a point can be scored by entry of the ball into the respective one of the structures 40 of the second set only during penalty periods in which the player is confined to the demarcated zone 70.

The first set of structures 30 and the second set of structures 40 can define two distinct scoring areas. For example, the second set of structures 40 can be smaller in size than the first set of structures 30. Preferably, the second set of structures 40 is half the size of the first set of structures 30, i.e., 12 ft. wide and 12 ft. high. However, other suitable dimensions are possible. In addition, according to an example embodiment, unlike the first set of structures 30 which includes three scoring zones, the second set of structures 40 has only one scoring zone.

According to an example embodiment, for each of four structures 40 of the second set, a respective one of four zones of the second set of zones 70 ("penalty zones") can be disposed adjacent to the respective structure 40 of the second set and within the boundaries of the playing area 20. However, it will be appreciated that other numbers of penalty zones 70 are possible, e.g., two or six, corresponding to the numbers of structures 40 of the second set.

The penalty zones 70 can have a triangular shape, the base of which faces, and/or shares and edge of, a respective one of the structures 40 of the second set. The penalty zones 70 can be positioned in front of the structures 40 of the second set and can be symmetrical with respect to the quadrant lines 90 that extend from the center region 80 of the playing area 20 toward the circumference of the playing area 20, such that a vertex of the triangular shaped penalty zone 70 lies along the quadrant lines 90. In addition, one side can be curved such that, with respect to the one side, the triangle is a Reuleaux type triangle. It will be appreciated that other configurations of the penalty zones 70 are possible which can be used in other embodiments, e.g., arc, square, semicircular, rectangular, or any other suitably appropriate geometric shape.

Four zones of the first set of zones 60 ("primary zones") can be disposed adjacent to a respective structure of the first set of structures 30 and within the boundaries of the playing area 20. However, it will be appreciated that other numbers of primary zones 60 are possible, e.g., two or six, corresponding to the numbers of structures of the first set of structures 30.

According to an example embodiment of the present invention, the rules of the game provide that players of each team can enter their assigned primary zones 60, i.e., players of one team cannot enter the primary zones 60 of the opposing team. As mentioned above, a player can be penalized for entering with any part of his/her body inside the opposing team's primary zones 60.

According to an example embodiment, the primary zones have a triangular shape, the base of which faces the structures of the first set of structures 30. The primary zones 60 can be positioned in front of the structures of the first set of structures 30 and can be symmetrical with respect to the quadrant lines 90 that extend from the center region 80 of the playing area 20 toward the circumference of the playing area 20, such that a vertex of the triangular shaped primary zones 60 lies along the quadrant lines 90. It will be appreciated that other configurations of the primary zones 60 are possible which can be used in other embodiments, e.g., arc, square, semicircular, rectangular, or any other suitably appropriate geometric shape.

In a method of playing the game according to an example embodiment, there is provided a playing area 20, a first set of structures 30 at a perimeter of the playing area 20 that are active throughout the game, and a second set of structures 40 at the perimeter of the playing area 20 that are active only during penalty periods of the game. At least one structure of the first set 30 and at least one structure of the second set 40 are assigned to a first team, and at least one structure of the first set 30 and at least one structure of the second set 40 are assigned to a second team. Each team has a predetermined equal number of players which may include players of either or both sexes, and preferably, men and women compete together to play the game. In a preferred embodiment, each team has twelve players. However, any numbers of players suitable for playing a game is within the scope of the present invention.

The game can be started by placing a ball in the playing area 20. For example, the game can begin when a referee places a ball at the center region 80 of the playing area 20 at the start of a game.

Points may be scored by propelling the ball into at least one of (i) at least one structure 30 of the first set and (ii) at least one structure 40 of the second set of the opposing team. Players from each team can attempt to cause the ball to enter an opposing team's first set of structures 30. The team not in possession of the ball attempts to prevent entry of the ball into its own first set of structures 30. If the team not in possession of the ball acquires possession of the ball, at least one player from that team attempts to cause the ball to enter the opposing team's first set of structures 30. If a player from either team causes the ball to enter the opposing team's first set of structures 30, the team on which the player who scored the ball is on is awarded at least one point. According to an example embodiment, the number of points awarded when causing the ball to enter a structure 30 is dependent upon which of three scoring zones of the structure 30 the ball is propelled through. A team whose point tally is the highest at an end of the game is the winner of the game.

According to an example embodiment, the ball can only be propelled via kicking. The use of heading or using ones hands are not allowed, and players who use either can be penalized, with the exception of goal keepers who can use their hands to catch/propel the ball. In an alternative embodiment of the present invention, heading or using ones hands by other players can be allowed for propelling the ball, especially where special head gear is worn by all players upon the approval of both teams.

The players can go anywhere on the playing area 20 except for the opposing team's primary zones 60. If a player enters the opposing team's primary zones 60, the ball can be forfeited to the opposing team at or near the center region 80 of the playing area 20, unless the player was forced into the opposing team's primary zone 60 by a player of the opposing team. In an alternative embodiment of the present invention, a player can enter the opposing team's primary zones 60 without being penalized and/or without forfeiting the ball.

Each goal keeper defends one structure of each of the first set of structures 30 and acts to prevent players from the opposing team from causing the ball to enter the structure 30 assigned to the goals keeper's team. A goal keeper can use any part of his/her body to propel the ball. The goal keeper can stay within the primary zone 60 adjacent to the structure the goal keeper is defending and/or the goal keeper may move outside the primary zone 60 anytime during the game.

Each of the primary zones 60 can only be occupied by the goal keeper and no other player of either team may enter such zones 60. If a player on the same team as the goal keeper voluntarily enters, i.e., without being forced into such zone by an opposing player, a primary zone 60 during, for example, a scoring attempt by the opposing team, such player will be penalized. If a player of the team attempting to score voluntarily enters, i.e., without being forced into such zone by an opposing player, the primary zone 60, the play will stop and the opposing team will be awarded the ball to continue play from the center of the field.

In an alternative embodiment, the goal keeper must stay within the primary zone 60 adjacent to the structure the goal keeper is defending. If the goal keeper leaves the primary zone 60, a penalty can be awarded to the opposing team.

There are two ways of scoring points during the game. The first way is to cause the ball to enter one of an opposing team's structures of the first set of structures 30. This can occur anytime during duration of the game. The second way is to cause the ball to enter one of an opposing team's structures of the second set of structures 40. This can occur only during a time period in which the opposing team is penalized, e.g., when a penalty zone 70 is occupied by a penalized player of the opposing team, and only the specific penalty zone(s) 70 that is adjacent to the structure 40 of the second set is available for scoring. The structures 30 of the first set are configured so that access for entry therein of a ball is never restricted, while the structures 40 of the second set are configured to selectively provide access for entry therein of the ball only during penalty periods of the game.

As mentioned above, a player or team can be penalized for various infractions of the rules. When a player is penalized, the penalized player can be assigned to the nearest penalty zone 70 to where the penalty occurred, which the penalized player must then defend during a penalty period. In a preferred embodiment, the penalty period is three minutes. However, other amounts of time are within the scope of the present invention.

If a player on a team causes the ball to enter a structure 40 of the second set which is adjacent a penalty zone occupied by a penalized player, at least one point can be awarded to that team. If it is the first time during the game that a ball enters a structure 40 of the second set of one team, one point can be awarded to the opposing team. If it is the second time, two points can be awarded. If it is the third time, or any subsequent time during the game, three points can be awarded.

When the penalty zones 70 are not occupied, or when a particular penalty zone 70 is not occupied, then the penalty zones 70 or the particular penalty zone 70, respectively, is not available for scoring, and if a player of one team propels the ball through such a zone 70, the ball can be awarded to the opposing team at a predetermined location on the playing area, and/or a penalty can be issued to the player who propelled the ball.

In an alternative example embodiment of the present invention, there can be three or more ways of scoring points during the game. In such an embodiment, there can be three or more different sets of scoring structures disposed alternately and intermittently around the circumference of the playing area.

In an alternative example embodiment of the present invention, the different types of scoring structures can be disposed alternately and intermittently within the playing area 20, rather than along the circumference of the playing area 20, or can be disposed within the playing area 20 and along the circumference of the playing area 20.

In an alternative example embodiment, the ball can be propelled via a stick, bat, club, racquet, or any other similar device capable of propelling a ball. The ball can be a soccer ball, tennis ball, volleyball, football, racquet ball, baseball, or any other ball capable of being propelled by a device. The device and the ball can be customized for use in the game.

In an alternative example embodiment, the ball can be propelled via a player's hands, in which case, a player may throw/pass the ball to each other via the player's hands, and/or score by propelling the ball into a goal via the player's hands.

In a preferred example embodiment, the ball is a sphere six inches in diameter. However, any sized and/or shaped ball suitable for playing a game is within the scope of the present invention. In an alternative embodiment, instead of a ball, a puck or similar device can be used. In the case of a puck, for example, the puck can be propelled via the use of a stick.

According to an example embodiment, the rules of the game allow unlimited substitutions during the game. According to an example embodiment, each team has twelve players, of which ten are field players and two are goal keepers. However, the numbers of field players and goal keepers can vary.

According to an example embodiment, all players can be unrestricted in that they can play both offense and defense during the game. In an alternate embodiment, half of the players on each team will be referenced and identified as either offense or defense players in which only the offensive players can propel the ball and score, and only the defensive players can attempt to take possession of the ball from the opposing team and direct it to an offensive player on their own team.

According to an example embodiment, all players, i.e., both offense and defense players have full access to the field of play, i.e, the playing area, except as indicated above with respect to certain players entering the primary zones 60. In an alternate embodiment, in which there are designated offensive and defensive players, only the team possessing the ball in a particular quadrant can have other offensive players occupying that quadrant and only defensive players of the other team can occupy that quadrant in which the other team possesses the ball. In such case, players on both teams can be allowed adequate time by the referee(s) to position themselves accordingly as the ball is propelled around the field and one team or the other takes possession of the ball.

There can be four periods per game, each period equaling fifteen minutes. However, any amount of time and any number of periods is within the scope of the present invention. Playing time is accumulated while the ball is in play and continues until the ball is out of play. Each team can have a predetermined number of time-outs per game. When a time-out is called, the time is stopped and the ball is out of play. Each team can have a predetermined number of minutes during a time-out before play resumes. When play resumes at the end of the second quarter, the teams can switch their assigned first and second sets of structures 30, 40 for the duration of the game.

Four referees can be assigned to a game. The referees ensure the game is played as indicated by the rules. The referees can be assigned to specific quadrants of the playing area and can be responsible for play and infractions within that quadrant. However, any number of referees is within the scope of the present invention. In a preferred embodiment, at least two referees are assigned to a game. At least one referee keeps track of time and determines if a score has occurred and for how many points, and also records the score, and all referees watch for infractions of the rules and award penalties where appropriate.

The game concludes when the time for the game runs out. The winner of the game is the team with the highest score. If the score is tied at the end of regulation play, the teams play an overtime period. Before the overtime period begins, the goal keepers can be removed from the primary zones 60, and the ball is placed at the center region 80 of the playing area 20. Upon signal from a referee, players from each team can attempt to score a point by causing the ball to enter any one of the four opposing structures 30, 40 of the first and second sets. Each team can assign up to four field players to defend individual first or second scoring structures 30, 40 during overtime play. The first team to score at any of the first and second sets of structures 30, 40 wins the game.

An example embodiment of the present invention is directed to one or more hardware computer-readable media, e.g., as described below, having stored thereon instructions executable by a processor to perform the methods described herein. For example, an example embodiment of the present invention is directed to a computer system. The computer system can include at least one processor which can be configured to display a graphical user interface (GUI) that includes a graphical representation of a playing area 20, a first set of graphical structures 30 arranged at a perimeter of the graphical representation of the playing area 20, and a second set of graphical structures 40 arranged at the perimeter of the graphical representation of the playing area 20. Each pair of adjacent ones of structures 30 of the first set can be separated by one of the structures 40 of the second set. All of the graphical structures 30 of the first set can be set to a ball entry state for an entire duration of the game.

The at least one processor can further be configured to, in response to satisfaction of a predetermined penalty condition, change a state of each of at least one of the graphical structures 40 of the second set to a ball entry state in which a ball representation can satisfy an entry condition in which the ball is considered to enter the respective structure 40 responsive to user input for play of a game.

An example embodiment of the present invention is directed to a method, e.g., of a hardware component or machine, of transmitting instructions executable by a processor to perform the methods described herein.

An example embodiment of the present invention is directed to a computer game, a video game, an electronic game, and/or any other electronic platform on which game play is possible ("the electronic game"). One or more processors, which can be implemented using any conventional processing circuit and device or combination thereof, e.g., a Central Processing Unit (CPU) of a Personal Computer (PC) or other workstation processor, execute code provided, e.g., on a hardware computer-readable medium including any conventional memory device, to perform any of the methods described above, alone or in combination. The one or more processors can be embodied in a server or user terminal or combination thereof. The user terminal can be embodied, for example, a desktop, laptop, hand-held device, Personal Digital Assistant (PDA), television set-top Internet appliance, mobile telephone, smart phone, electronic game consoles etc., or as a combination of one or more thereof. The computer game, video game, etc. can be combined with physical elements/players. The game can involve interaction by a user or a plurality of users with a user interface to generate visual and/or audio feedback on a video and/or audio device. Moreover, the users can play the game against each other using terminals connected over a network. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. Such devices can be used to play the game described above. The game can be controlled by a game controller which can include one or more buttons and one or more joysticks. For example, a processor executing stored code can keep track of game time, points, and penalty periods, and can interpret user control of an input device, e.g., a keyboard, joystick, touchscreen, etc., as player movements and maneuvers.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification.

Accordingly, while the present invention has been disclosed in connection with the above non-limiting embodiments, it should be understood that other embodiments can fall within the spirit and scope of the invention, as defined by the following claims.

What is claimed is:

1. An arrangement for playing a game, comprising:
a playing area;
a first set of scoring structures arranged at a perimeter of the playing area and that are active throughout the game;
a second set of scoring structures arranged at the perimeter of the playing area and that are active only during penalty periods of the game; wherein:
each pair of adjacent ones of structures of the first set is separated by one of the structures of the second set;
the playing area includes a first set of demarcated zones and a second set of demarcated zones;
each zone of the second set of zones is proximate a respective one of the structures of the second set of structures; and
each structure of the second set includes a gate which is configured to open and close to thereby selectively control entry of a ball therethrough;
a sensing system, including a plurality of sensors, the plurality of sensors including for each of at least one of the second set of zones a respectively associated sensor; and
a processor coupled to the plurality of sensors, the processor configured to, for the each of the at least one of the second set of zones:
receive data from the respective sensor associated with the respective zone;
in a first determining step and based on the received data, determine whether a penalized player is occupying the respective zone;
based on the determination, determine, in a second determining step, whether the gate is to be open or closed; and
control the gate in accordance with the determination of the second determining step.

2. The arrangement of claim 1, further comprising:
a barrier surrounding, and defining an outer boundary of, the playing area, the structures at least one of (i) disposed in the barrier and (ii) defining openings in the barrier.

3. The arrangement of claim 1, wherein all of the structures of the first set are structurally the same as each other and are structurally different than the structures of the second set.

4. The arrangement of claim 3, wherein each structure of the first set is divided into a respective plurality of scoring zones.

5. The arrangement of claim 1, wherein all of the structures of the second set are structurally the same as each other.

6. The arrangement of claim 1, wherein the structures of the first set are configured so that access for entry therein of a ball is never restricted, and the structures of the second set are configured to selectively provide access for entry therein of the ball only during penalty periods of the game.

7. The arrangement of claim 1, wherein the playing area is circular with the structures of the first and second sets being positioned at respective positions along the circumference of the circular playing area.

8. The arrangement of claim 7, wherein a diameter of the circular playing area is approximately 80-100 yards.

9. The arrangement of claim 1, wherein the plurality of structures are equally spaced about the perimeter of the playing area.

10. The arrangement of claim 1, wherein each structure of the second set is centered on a center point between two adjacent structures of the first set.

11. The arrangement of claim 1, wherein for each pair of adjacent ones of structures of the first set, a distance between the pair of structures is the same as a distance between the structures of each other pair of adjacent ones of the structures of the first set.

12. The arrangement of claim 11, wherein for each pair of adjacent ones of structures of the second set, a distance between the pair of structures is the same as a distance between the structures of each other pair of adjacent ones of the structures of the second set.

13. The arrangement of claim 1, wherein the playing area is one of a field, court, ice rink, and swimming pool.

14. The arrangement of claim 1, wherein:
each zone of the first set of zones is proximate a respective one of the structures of the first set of structures;
the zones of the first set of zones are different than the zones of the second set of zones; and
penalized players are confined to at least one of the second set of zones during a penalty period of the penalty periods.

15. The arrangement of claim 14, wherein each of the zones is triangular with one side of the triangle extending between exterior edges of a respective one of the structures.

16. The arrangement of claim 15, wherein the one side is curved such that, with respect to the one side, the triangle is a Reuleaux type triangle.

17. The arrangement of claim 14, wherein the arrangement is configured to determine whether the zone proximate an individual structure is occupied by one of the penalized players, and wherein the gate of the individual structure of the second set opens when the zone proximate the individual structure is occupied by the penalized player.

18. The arrangement of claim 17, wherein one of:
a sensor determines whether the zone proximate the individual structure is occupied by the penalized player, and the gate of the individual structure of the second set is opened by a computer processor in response to data from the sensor; and a referee determines whether the zone proximate the individual structure is occupied by the penalized player, and the gate of the individual structure of the second set is opened by the computer processor in response to user-input from the referee concerning occupation of the zone.

19. The arrangement of claim 1, further comprising:

at least one structure sensing system including at least one respective structure sensor associated with each of the structures of the first and second set;

wherein the processor is coupled to the plurality of structure sensors, and configured to determine, based on data from the at least one sensing system, whether a ball has entered any of the structures.

\* \* \* \* \*